Patented June 28, 1932

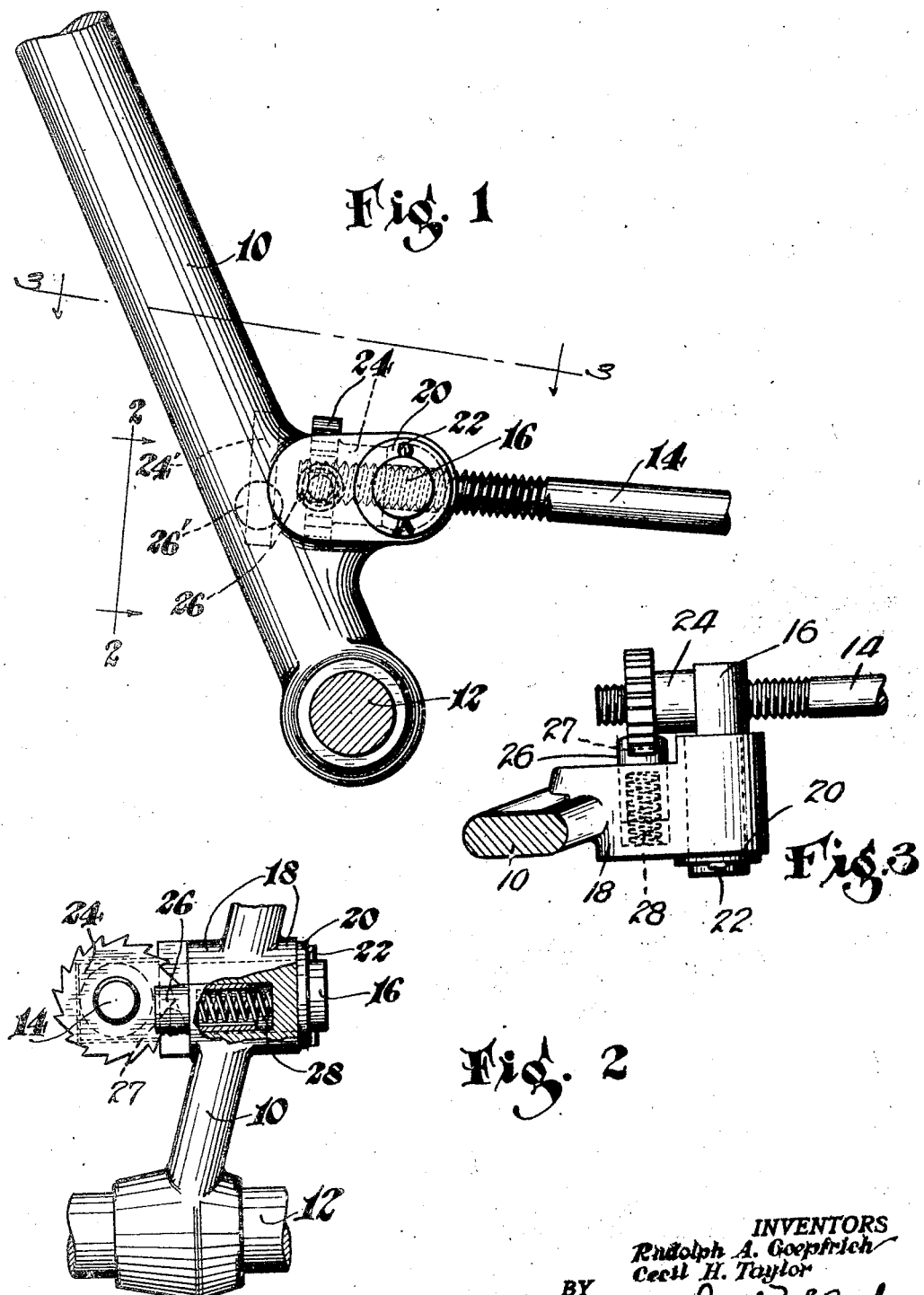

1,864,902

UNITED STATES PATENT OFFICE

RUDOLPH A. GOEPFRICH, OF SOUTH BEND, INDIANA, AND CECIL H. TAYLOR, OF DETROIT, MICHIGAN, ASSIGNORS TO BENDIX BRAKE COMPANY, OF SOUTH BEND, INDIANA, A CORPORATION OF ILLINOIS

SLACK ADJUSTING OPERATING MECHANISM

Application filed February 28, 1929. Serial No. 343,520.

This invention relates to operating mechanism for brakes or the like, and is illustrated as embodied in a novel pedal mechanism for a system of automobile brakes. An object of the invention is to provide a simple and inexpensive and preferably automatic adjustment for taking up slack in the system, and especially to provide an adjustment which is self-contained and does not depend for its successful operation on the setting of any external stops or the like.

In one desirable arrangement there are two interengaging parts, preferably both carried by the brake pedal or an equivalent operating lever, and which are so moved in depressing the pedal that one has a component of movement at an angle to the direction of movement of the other, so that it is shifted to a new position of interengagement when the pedal is depressed beyond a predetermined arc, whereupon it operates the other part to make the adjustment when the pedal is released. In the arrangement illustrated, one part is a ratchet nut threaded on the brake pull-rod or its equivalent and connecting it to the pedal, while the other part is a pawl which is moved automatically into engagement with the next tooth of the ratchet nut when the pedal goes too far down and which then turns the nut to take up on the pull rod when the pedal is released.

The above and other objects and features of the invention, including various novel and desirable details of construction, will be apparent from the following description of the illustrative embodiment shown in the accompanying drawing, in which:

Figure 1 is a side elevation of part of the pedal and the pull-rod, showing the automatically-adjusted connection;

Figure 2 is a front elevation of the same parts, looking in the direction of the arrows 2—2 of Figure 1, and partly broken away to show the pawl, and Figure 3 is a section on the line 3—3 of Figure 1.

In the arrangement illustrated, the pedal lever is shown at 10, fulcrumed at its lower end on a support such as a shaft 12. This lever is intended to operate means such as a pull-rod 14 connected to the brake linkage. Rod 14 passes through an opening in the end of a transverse pivot 16 journaled in a boss 18 formed on the pedal, the pivot being held in position by a washer 20 and cotter pin 22. The rod is threaded at its end to receive a ratchet nut 24. This nut seats on the pivot 16 as shown in Figure 1. The ratchet nut 24 forms an adjustable connection between the pedal and the rod 14, and takes up on rod 14 when turned in a direction to move it along the threads of rod 14.

The ratchet nut 24 forms one part of the automatic adjustment. The other part is a plunger 26, bifurcated to confine the nut 24 and provided with a pawl 27 engaging the ratchet. The plunger is slidable in a socket in pedal 10 and is urged against the ratchet teeth of nut 24 by means such as a coil spring 28 compressed between the plunger and the base of its socket.

The plunger 26 is so arranged that its arc of movement, when the pedal is depressed, has a substantial downward component, whereas ratchet nut 24 is arranged to move substantially horizontally. Thus when the pedal is depressed beyond a predetermined maximum arc, ratchet nut 24 may have moved in Figure 1 to the dotted line position 24', whereas pawl 26 has moved downwardly to 26' sufficiently to take hold of the next ratchet tooth of nut 24. Now when the pedal is released, the pawl 26 in moving back upward will turn nut 24 a distance corresponding to one tooth of the ratchet, thereby taking up on rod 14 or its equivalent.

It should be noted that the tension of the parts during the depression of the pedal creates a substantial friction between pivot 16 and the base of nut 24 which prevents the nut from turning in either direction at that time, whereas after the release of the pedal the pawl 26 prevents the nut from turning.

While one illustrative embodiment has been described in detail, it is not our intention to limit the scope of the invention to that particular embodiment, or otherwise than by the terms of the appended claims. The present application is junior to application No. 341,891, filed February 23, 1929, by Rudolph A. Goepfrich as sole inventor.

We claim:

1. Operating mechanism comprising, in combination, a lever pivoted at its end and having a part moved substantially horizontally when the lever is oscillated, an operated member having threaded thereon a ratchet nut which engages said part and which moves substantially horizontally with said part, and a spring-pressed pawl slidably carried by the lever and engaging said nut and which is moved by oscillation of the lever in a direction having a substantial vertical component so that on oscillation of the lever beyond a predetermined arc it will take hold of the next tooth of the ratchet nut and turn the nut a corresponding distance when the lever is released.

2. Operating mechanism comprising, in combination, a pivoted lever, an operated member having threaded thereon a ratchet nut which engages a part carried by said lever and a longitudinally-slidable pawl carried by the lever and engaging said nut and which is moved by oscillation of the lever in a direction having a substantial component in a different direction from the movement of the nut so that on oscillation of the lever beyond a predetermined arc it will take hold of the next tooth of the ratchet nut and turn the nut a corresponding distance when the lever is released.

3. Operating mechanism comprising, in combination, a pivoted lever, an operated member having threaded thereon a ratchet nut which engages a part carried by said lever and a longitudinally-slidable pawl carried by the lever and engaging said nut and which is moved by oscillation of the lever in a direction having a substantial component in a different direction from the movement of the nut so that on oscillation of the lever beyond a predetermined arc it will take hold of the next tooth of the ratchet nut and turn the nut a corresponding distance when the lever is released, said nut being held against turning during the depression of the lever by the tension on said member and being held against turning when the lever is in released position by said pawl.

In testimony whereof, I have hereunto signed my name.

CECIL H. TAYLOR.

In testimony whereof, I have hereunto signed my name.

RUDOLPH A. GOEPFRICH.